(12) United States Patent
Rode

(10) Patent No.: US 10,678,346 B2
(45) Date of Patent: Jun. 9, 2020

(54) METHOD FOR INTERACTING A POINTING DEVICE WITH A TARGET POINT ARRANGED ON A PROJECTION SCREEN OF A VIRTUAL DESKTOP AND POINTING DEVICE THEREFORE

(71) Applicant: Oliver Horst Rode, Frankfurt am Main (DE)

(72) Inventor: Oliver Horst Rode, Frankfurt am Main (DE)

( * ) Notice: Subject to any disclaimer, the term of this patent is extended or adjusted under 35 U.S.C. 154(b) by 0 days.

(21) Appl. No.: 16/394,696

(22) Filed: Apr. 25, 2019

(65) Prior Publication Data

US 2019/0332192 A1    Oct. 31, 2019

(30) Foreign Application Priority Data

Apr. 30, 2018  (DE) .......................... 10 2018 206 676

(51) Int. Cl.
| | |
|---|---|
| *G06F 3/0346* | (2013.01) |
| *G06F 3/01* | (2006.01) |
| *G06F 3/03* | (2006.01) |
| *G06F 3/038* | (2013.01) |
| *G06F 3/0482* | (2013.01) |

(52) U.S. Cl.
CPC ............ *G06F 3/0346* (2013.01); *G06F 3/017* (2013.01); *G06F 3/0304* (2013.01); *G06F 3/038* (2013.01); *G06F 3/0482* (2013.01)

(58) Field of Classification Search
CPC ........ G06F 3/014; G06F 3/017; G06F 3/0304; G06F 3/0346; G06F 3/038; G06F 3/0482
See application file for complete search history.

(56) References Cited

U.S. PATENT DOCUMENTS

| | | | | |
|---|---|---|---|---|
| 9,317,108 | B2 * | 4/2016 | Touma | ................... G06F 3/014 |
| 2011/0025598 | A1 * | 2/2011 | Underkoffler | ........... G06F 3/017 |
| | | | | 345/156 |
| 2011/0025603 | A1 * | 2/2011 | Underkoffler | ........... G06F 3/017 |
| | | | | 345/158 |
| 2011/0267265 | A1 * | 11/2011 | Stinson | ................... G06F 3/017 |
| | | | | 345/157 |
| 2015/0077435 | A1 * | 3/2015 | Koga | .................... G06T 19/006 |
| | | | | 345/633 |
| 2015/0153833 | A1 | 6/2015 | Pinault et al. | |

(Continued)

*Primary Examiner* — Dmitriy Bolotin

(74) *Attorney, Agent, or Firm* — Muirhead and Saturnelli, LLC

(57) ABSTRACT

A pointing device interacts with a target point arranged on a projection surface of a virtual desktop and a pointing device. A spatial coordinate of a target point may be determined by means of an image processing system from a two-dimensional optical code applied to a carrier plane associated with the pointing device, and may be transmitted as a control variable to a control unit of the projection surface. A spatial position of a normal vector perpendicular to the center of gravity of the surface of the code may be determined. The normal vector may be aligned with the target point by shifting and tilting the carrier plane. A rotational movement of the carrier plane about an axis of rotation perpendicular to the carrier plane may be detected, and an activation signal of the pointing device may be generated as a function of a detected rotational movement.

10 Claims, 1 Drawing Sheet

(56) References Cited

U.S. PATENT DOCUMENTS

| | | |
|---|---|---|
| 2015/0371083 A1* | 12/2015 | Csaszar .............. G06K 9/00355 |
| | | 382/103 |
| 2016/0286190 A1 | 9/2016 | Kubota |
| 2016/0320846 A1 | 11/2016 | Michele |
| 2017/0371405 A1 | 12/2017 | Kwon et al. |
| 2018/0095166 A1* | 4/2018 | Inoue ....................... G01C 1/04 |
| 2019/0333230 A1* | 10/2019 | Rode ....................... G06T 7/246 |

* cited by examiner

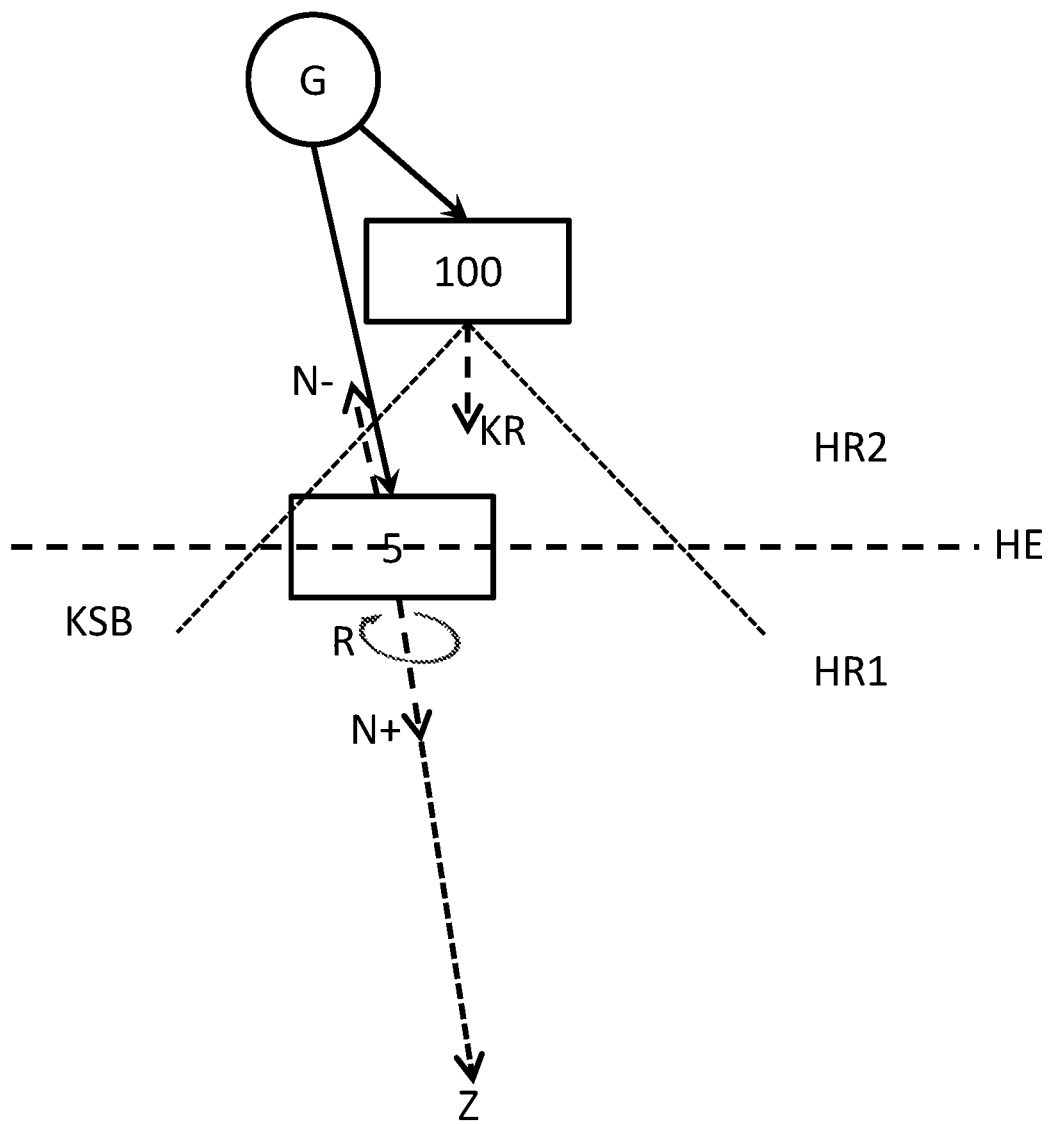

METHOD FOR INTERACTING A POINTING DEVICE WITH A TARGET POINT ARRANGED ON A PROJECTION SCREEN OF A VIRTUAL DESKTOP AND POINTING DEVICE THEREFORE

TECHNICAL FIELD

The system described herein concerns a method of interacting a pointing device with a target point located on a projection screen of a virtual desktop and a pointing device adapted therefor.

BACKGROUND OF THE INVENTION

Pointing devices as input devices for the interaction of a user with graphical user interfaces are known in large numbers from the state of the art, whereby their types of execution differ depending on the usage context and technical concept of the user interfaces. Common pointing devices such as a trackball, light pen, graphics tablet, joystick, computer mouse or touch screen or touch pad are primarily designed for user interaction with a real computer screen. For the interaction of a user with a virtual desktop, the so-called Wii® remote controller is known from the state of the art, which is used in connection with computer games or applications on the so-called Wii® platform of the manufacturer Nintendo. In this system, acceleration values (which are generated by the user by turning or translatory shaking of the remote controller) are recorded and transmitted to the control device of the output device (i.e., of the game controller of the Wii® platform). In this context, input devices are also known in which a camera detects pointing movements of a game participant and transmits them to the control device of the output device. Furthermore, in connection with so-called data spectacles, in which data contents generated by means of a computer system are projected onto a surface aligned in the field of vision of the spectacle wearer, an input device physically integrated into the data spectacles is known, in which a pointing device is aligned with a target point on the projection surface by changes in the inclination of the data spectacles or the head of the human user and activation (or other user action) with respect to the targeted target point is triggered by actuation of a button or button arranged on the frame of the data spectacles.

A disadvantage of such systems is that the user of such pointing devices sometimes has to perform very strong physical movements in order to align the pointing device to a desired target point. This applies in particular if this target point is located in an edge area of the project area. On the one hand, this is uncomfortable for the user and meets with social acceptance problems in the public. In addition, pressing a confirmation button or a confirmation key on the data glasses is cumbersome. As a result, the acceptance of virtual desktops in general and data glasses in particular is low and hinders their wider dissemination.

SUMMARY OF THE INVENTION

The system described herein includes providing a method for interacting a pointing device with a target point arranged on a projection surface of a virtual desktop and a pointing device set up for this purpose, which overcomes these disadvantages of the state of the art. The interaction should be possible in a less conspicuous way and with simple body movements.

In accordance with the embodiments of the system described herein, a spatial coordinate of a target point may be determined by means of an image processing system from a two-dimensional optical code applied to a carrier plane associated with the pointing device, and transmitted as a control variable to a control unit of the projection surface. In a first method step, the spatial position of a normal vector perpendicular to the center of gravity of the surface of the code may be determined by means of the image processing system. The normal vector may be aligned with the target point in a second method step by shifting and tilting the carrier plane. In a third method step, a rotational movement of the carrier plane about an axis of rotation perpendicular to the carrier plane may be detected by means of the image processing system, and an activation signal of the pointing device may be generated as a function of a detected rotational movement. In the context of the system described herein, spatial coordinates may be understood to mean any kind of data to designate an absolute or relative spatial position of the target point.

In this way, the interaction of the pointing device with the target point may be effected by means of a simple, essentially two-dimensional carrier medium on which a machine-readable two-dimensional code may be applied and which may be aligned in such a way by means of simple hand movements by translatory displacement along an axis parallel to the carrier plane and by rotational tilting about a tilting axis The tip of a vector whose spatial orientation may be determined by the normal vector determined in the first method step in the area center of gravity of the surface occupied by the code, and whose tip (and thus also whose length from the starting point) may be determined by the target point to be controlled and thus predetermined on the projection surface, may point to the target point to be controlled and coincides therewith. By means of an additional gesture movement in the form of a rotational movement of the carrier plane about an axis of rotation perpendicular to the carrier plane, an activation signal of the pointing device may be generated.

This additional gesture movement may be carried out with the same hand and from the same sequence of movements as the alignment of the carrier plane to the target point provided for in the first process step. Both movement sequences may be realized by anyone by using their wrist without special difficulties and further physical activities. The operation of the pointing device and thus the interaction with the target point may be possible in a much simpler way compared to the previous state of the art, using less pronounced body movements compared to the previous state of the art.

In the context of the system described herein, an activation signal means any type of signal generated by the pointing device and sent to the control means of the projection surface in which it causes a change of state logically or physically associated with the target. This may include marking or highlighting the target point on the projection surface, opening a context menu logically linked to the target point, or launching a computer application or program logically linked to the target point.

In the context of the system described herein, a gesture means any kind of hand movement by means of which the carrier medium as such is moved relative to its surroundings.

In accordance with embodiments of the system described herein, in the third step, the direction of rotation of the rotational movement of the carrier plane of the code about an axis of rotation perpendicular to the carrier plane may be additionally recorded, and different activation signals of the pointing device may be generated as a function of the recorded direction of rotation of the rotational movement. In this way, it may be particularly easy to generate two different activation signals by means of the same gesture movement, which may be logically and/or physically related to the same target point. These activation signals may be, for example, the marking of the target point on the projection surface or the opening of a context menu logically linked to the target point. In this way one may create switch events according to embodiments of the system described herein, which correspond to the actuation of the right or left button of a conventional computer mouse.

Embodiments of the system described herein may include a pointing device for interacting with a target point located on a projection screen of a virtual desktop which may be arranged to perform a method according to any of the foregoing features.

BRIEF DESCRIPTION OF THE DRAWINGS

Embodiments of the system described herein will be explained in more detail below using an example and drawings. Shown below:

FIG. 1 is a schematic structure for the implementation of the system described herein, in accordance with an embodiment of the invention.

BRIEF DESCRIPTION OF VARIOUS EMBODIMENTS

FIG. 1 shows a schematic representation of a methodology according to embodiments of the system described herein. A gesture generator (G) has a sample card (5) (i.e., "pattern card") which may have a machine-readable two-dimensional code printed on one side. The pattern card (5) (or more specifically the surface of the pattern card bearing the code) defines a carrier plane (HE). As an alternative to a sample card, an electronic display also may be provided as a carrier medium for the code.

A camera (100) belonging to an image processing system has a field of view (KSB) which may be essentially determined by the viewing direction or optical axis (KR) of the camera, for example, in a known manner. The viewing direction of the camera (100) may be oriented away from the gesture generator (G). This could be the case, for example, if the gesturer holds the camera (e.g., integrated in a smartphone) with a first hand and the carrier medium (5) of the code with a second hand and points the camera at the code.

The gesture generator (G) then may use the pattern card (5) to define a virtual vector which, starting from the center of area of the code applied to the surface of the pattern card facing the camera, points to the spatial coordinate (Z) of a target point arranged on a projection surface of a virtual desktop. In a first step, a normal vector (N+) perpendicular to the area occupied by the code on the carrier plane (HE) may be determined. In a second step, the pattern map (5) may be shifted in space (e.g., by tilting or shifting parallel to the carrier plane (HE)) so that the normal vector (N+) is aligned in the direction of the spatial coordinate (Z) of the target point. The length of this vector results from its intersection point with the projection surface of the virtual desktop in the target point. Both the target point and the vector may be displayed in the field of view of data glasses. The method according to embodiments of the system described herein enables the wearer of the data glasses to control this target point on the projection surface of the virtual desktop integrated into the field of vision of the data glasses, for example, by means of a camera integrated into a smartphone. The field of vision of the camera may be aligned with the sample card (5) or the code attached to it and may be handled by the operator in the manner according to embodiments of the system described herein in order to align the vector directed towards the target point.

In a third process step, the camera (100) of the image processing system may detect a rotational movement (R) of the carrier plane (HE) about an axis of rotation perpendicular to the carrier plane and, in dependence thereon, generate an activation signal of the pointing device. By additionally detecting the direction of rotation of this rotational movement (R), two different activation signals may be generated. In this way, the user may implement two different switching events by means of the pointing device according to embodiments of the system described herein. For example, the user may mark the target point on the projection surface, for example, using an embodiment of the method and/or device described herein and a context menu that displays further information relevant to the target point on the virtual desktop.

Various embodiments of the system described herein may be implemented using software, firmware, hardware, a combination of software, firmware and hardware and/or other computer-implemented modules, components or devices having the described features and performing the described functions. Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate operating system.

Other embodiments of the invention will be apparent to those skilled in the art from a consideration of the specification and/or an attempt to put into practice the invention disclosed herein. It is intended that the specification and examples be considered as exemplary only, with the true scope and spirit of the invention being indicated by the following claims.

What is claimed is:

1. A method interacting a pointing device with a target point located on a projection surface of a virtual desktop, the method comprising:
   determining a spatial position of a normal vector perpendicular to a centroid of an area of a two-dimensional optical code applied to a plane of a carrier medium;
   aligning the normal vector to the target point by shifting and tilting the plane;
   detecting a rotational movement of the plane about an axis of rotation perpendicular to the plane;
   generating a first activation signal of the pointing device from the detected rotational movement; and
   transmitting the first activation signal as a control variable to a control unit controlling the projection surface.

2. The method of claim 1, wherein the control variable is used by the control unit to perform at least one of the following: mark a target point on the projection surface; open a context menu logically linked to the target point; and launch an application logically linked to the target point.

3. The method according to claim 1, further comprising:
sensing a direction of the rotational movement of the plane about the axis of rotation perpendicular to the plane; and
generating one or more second activation signals of the pointing device from the sensed direction of movement.

4. The method according to claim 3, further comprising:
transmitting the one or more second activation signals as one or more control variables to the control unit.

5. The method of claim 1, wherein a camera detects the rotational movement.

6. A pointing device for interacting with a target point located on a projection surface of a virtual desktop, the system comprising:
an image processing device that determines a spatial position of a normal vector perpendicular to a centroid of an area of a two-dimensional optical code applied to a plane of a carrier medium, aligns the normal vector to the target point by shifting and tilting the plane, and detects a rotational movement of the plane about an axis of rotation perpendicular to the plane, and
one or more control components that generate a first activation signal of the pointing device from the detected rotational movement, and control transmitting the first activation signal as a control variable to a control unit controlling the projection surface.

7. The pointing device of claim 6, wherein the control variable is used by the control unit to perform at least one of the following: mark a target point on the projection surface; open a context menu logically linked to the target point; and launch an application logically linked to the target point.

8. The pointing device according to claim 6, wherein the image processing device senses a direction of the rotational movement of the plane about the axis of rotation perpendicular to the plane, and
wherein the one or more control components generate one or more second activation signals of the pointing device from the sensed direction of movement.

9. The pointing device according to claim 8, wherein the one or more control components control transmitting the one or more second activation signals as one or more control variables to the control unit.

10. The pointing device of claim 6, wherein the image processing device includes a camera that detects the rotational movement.

* * * * *